United States Patent [19]

Venetz

[11] Patent Number: 4,517,762
[45] Date of Patent: May 21, 1985

[54] ANIMAL TRAP HOLDER

[76] Inventor: Louis M. Venetz, 206 Susquehanna Ave., West Pittston, Pa. 18643

[21] Appl. No.: 511,855

[22] Filed: Jul. 8, 1983

[51] Int. Cl.³ .......................................... A01M 23/24
[52] U.S. Cl. ..................................................... 43/96
[58] Field of Search ................. 43/96, 58, 88, 91, 92, 43/93

[56] References Cited

U.S. PATENT DOCUMENTS

| | | | |
|---|---|---|---|
| 1,909,930 | 5/1933 | Ridder | D25/75 |
| 2,801,600 | 8/1957 | Bowden | 52/732 |
| 3,010,245 | 11/1961 | Conibear | 43/92 |
| 3,318,561 | 5/1967 | Finke | 248/230 |
| 3,973,352 | 8/1976 | Souza | 43/92 |
| 3,974,592 | 8/1976 | Staats | 43/88 |
| 4,000,578 | 1/1977 | Souza | 43/92 |
| 4,152,861 | 5/1979 | Miller | 43/96 |
| 4,267,660 | 5/1981 | Kielhorn | 43/96 |
| 4,411,091 | 10/1983 | Hedstrom | 43/96 |

FOREIGN PATENT DOCUMENTS 867032  3/1971  Canada ..................................... 43/96

Primary Examiner—Gene P. Crosby
Attorney, Agent, or Firm—Michael J. Delaney

[57] ABSTRACT

An animal trap holder for a trap of the Conibear type having a pair of spring biased jaws. The holder is a U-shaped member with the two legs of the U connected together by an integral base. The outer surfaces of the legs and base are flat rectangular surfaces with the sides of the rectangular surfaces of a distance substantially greater than the thickness of the legs and base. The free ends of the legs of the U-shaped member have outwardly extending flange portions to cooperate with the outer surfaces of the legs to receive and support a substantial length of the jaws of the trap when the trap is set and to allow the jaws of the trap to be released when the trap is sprung. When it is desired to adjustably secure the holder to a stake, a U-shaped adaptor of about the same configuration as the holder is fastened to the holder and adjustably secured to the stake.

8 Claims, 3 Drawing Figures

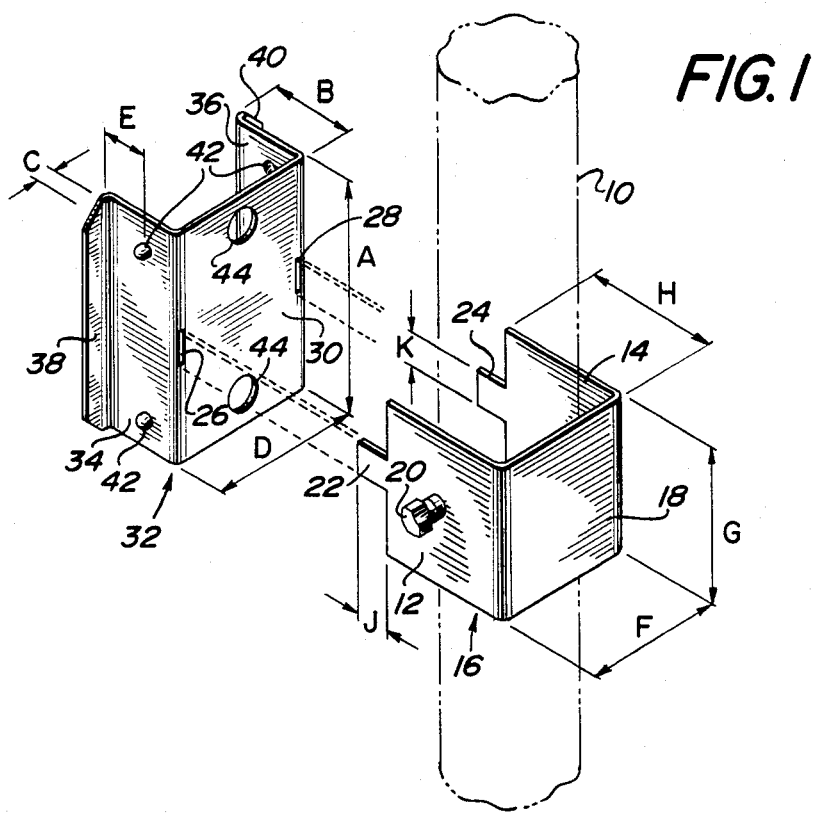
FIG. 1
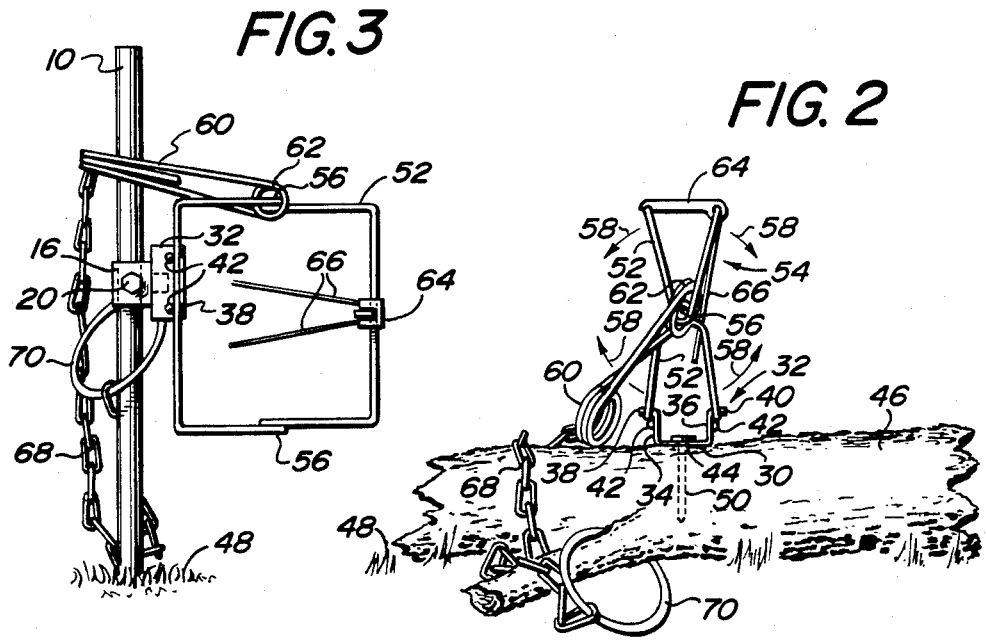
FIG. 3
FIG. 2

4,517,762

ANIMAL TRAP HOLDER

BACKGROUND OF THE INVENTION

This invention relates generally to trap holders and more specifically to a holder for a Conibear type trap.

In the past, a number of trap holders to support a Conibear type trap, as shown in U.S. Pat. No. 3,010,245, have been disclosed. For example, the holders shown in U.S. Pat. Nos. 3,974,592; 4,152,861 and 4,267,660. However, these holders were not entirely satisfactory for one or more of the following reasons. The holder was too cumbersome, too heavy and/or too bulky to handle or to carry over the many miles walked by a trapper. The holder could not be readily adapted to allow the setting of traps under the wide variety of conditions faced by the trapper in the field. The holder could not be adjusted in the field to accommodate the various sizes of Conibear type traps. The holder was too costly to use. The holder could not be readily adjusted to allow the trap to be set at the optimum position in the field.

SUMMARY OF THE INVENTION

It is an object of this invention to provide a holder for an animal trap of the Conibear type wherein the holder is small, light in weight, compact and easy to carry and handle.

It is another object of this invention to provide a holder for an animal trap wherein the holder can be readily adapted to allow the trap to be set under a wide variety of field conditions and in the optimum position.

It is still another object of this invention to provide an animal trap holder which can be adjusted to accommodate different sizes of Conibear type traps.

It is a further object of this invention to provide a holder for a Conibear type trap which holder is inexpensive to manufacture and use.

The above objects can be obtained by the animal trap holder of this invention. The holder comprises a substantially U-shaped member. The first and second legs of the U-shaped member are connected together by an integral base portion. The outer surfaces of the legs and base portion are flat rectangular surfaces. The free ends of the first and second legs are manually adjusted toward and away from each other to accommodate different sizes of Conibear traps. The free ends of the legs include an integral outwardly extending flange portion which in combination with the outer surfaces of the legs receive and hold the jaws of the Conibear type trap when the trap is set and allow the jaws to be released when the trap is sprung The jaws of the Conibear type trap are in contact with the outer surfaces of the first and second legs for a substantial distance, thus providing for firm support of the trap on the holder. In combination with the trap holder, an adaptor may be used to allow the trap holder to be adjustably positioned along a stake or the like. The adaptor is also in the shape of a U with the stake positioned between the legs of the U. The free ends of the legs of the adaptor each have a tongue extending therefrom. The tongue is received in a corresponding slot in the base portion of the holder and thereafter the tongues are bent to secure the holder and adaptor to each other. A bolt is in threaded engagement with one leg of the U-shaped adaptor and bears upon the stake and adjustably secures the holder to the stake.

BRIEF DESCRIPTION OF THE DRAWINGS

FIG. 1 is a perspective type view of the holder and adaptor of this invention.

FIG. 2 is an end view showing the holder of this invention supporting a Conibear type trap.

FIG. 3 is an elevation view showing the holder and the adaptor of this invention adjustably supporting a Conibear type trap.

DETAILED DESCRIPTION OF THE DRAWINGS

Referring to FIG. 1, shown in phantom outline is a stake 10 which extends between the adaptor legs 12,14 of U-shaped adaptor 16. The legs 12,14 of adaptor 16 are connected together by an integral base portion 18. Bolt means 20 is in threaded engagement with a hole in leg 12 and is used to adjustably secure the adaptor 16 at any desired position along stake 10. The outer free ends of legs 12,14, each include a tongue portion 22,24, respectively, which is sized to fit into and through slots 26,28 in base portion 30 of trap holder 32. The trap holder is in the shape of a U and includes first and second leg portions 34,36 connected together by integral portion 30. Each leg 34,36 has an outer flat rectangular surface. The base portion 30 has an outer flat rectangular surface. Each leg 34,36 has a flange portion 38,40, respectively, which extends outwardly from the free end of the leg portions 34,36. A pair of dimples 42 are formed in the outer surface of each leg 34,36 by striking the inside surface of legs 34,36 with a rounded tool so that rounded raised portions or dimples 42 are formed on the outer surface of legs 34,36. The pair of dimples 42 on each leg 34,36 are spaced from each other and equally spaced from the flange portions 38,40. To facilitate securing the holder 32 in position holes or openings 44 are provided in the base 30 of holder 32.

Referring to FIG. 2, holder 32 is secured to log 46, which is resting on the ground 48, by means of a nail 50 which extends through hole 44 in base 30 and into log 46.

Referring to FIGS. 2 and 3, the wire jaws 52 of a Conibear type trap are pivoted together at pivot points 56. The jaws 52 are biased to close, i.e. move in the direction of arrows 58 of FIG. 2, by coil spring 60 having loops 62 disposed about jaws 52. The jaws 52 are held in the set position by retainer 64 which includes a trigger 66 which extends into the opening defined by jaws 52. One end of the retainer 64 is rotatably secured to one jaw 52 and the other end is releasably secured to the other jaw 52, such that when trigger 66 is moved the jaws 52 move in the direction of arrows 58 to a closed or sprung position. Attached to coil spring 60 is one end of a retaining chain 68. The other end of the chain is attached to a ring 70. In FIG. 2, the ring is placed about a limb of log 46, while in FIG. 3 the ring 70 is placed about stake 10.

Referring to FIGS. 2 and 3, the jaws 52 of the Conibear trap, which are parallel to each other, are moved against the force of coil spring 60 toward each other and into contact with a substantial distance on the outer surface of legs 34,36 such that the jaws 52 are positioned between flange portions 38,40 and the corresponding dimples 42. The legs 34,36 are adapted to deflect towards each other and the retainer 64 is releasably attached between the jaws 52. The legs 34,36 due to their deflection are bearing outwardly in frictional engagement for a substantial distance of the jaws 52 to firmly support the trap 54 in position. As noted above, the leg portions may be moved outwardly or inwardly to vary the outward force exerted by the legs 34,36 due to their deflection and thus accommodate different sizes of Conibear traps. If the leg portions are moved outwardly the force will be greater and if moved inwardly the force will be less. In addition, the greater the force exerted by the legs 34,36 on the jaws 52 of the trap 54 the quicker the jaws of the trap will close when the trigger 66 is moved.

Referring to FIG. 3, stake 10 is driven into ground 48 and adaptor 16 is positioned about stake 10. Holder 32 is secured to adaptor 16 by inserting tongues 22,24 of adaptor 16 into slots 26,28, respectively, of base 30 and thereafter tongues 22,24, as best seen in FIG. 1, are bent. Adaptor 16 is positioned at the desired height above ground 48 by adjusting bolt means 20 to bear against the stake 10 which in turn bears against leg 14 of adaptor 16.

SPECIFIC EMBODIMENT

It has been found that the holder 32 and adaptor 16 of this invention may be made of 20 gauge cold rolled sheet steel and may have the following dimensions as shown in FIG. 1

---
A = 1½ inches          F = 1 inch
B = ⅜ inch             G = 1 inch
C = ¼ inch             H = 1 inch
D = 1⅛ inches          J = ¼ inch
E = ¼ inch             K = 7/32 inch
Diameter of Holes 44 = ⅛ inch.
Diameter of Dimples 42 = ¼ inch.
Height of Dimples 42 = 1/16 inch.
Size of Slots 26,28 = ¼ by 0.030 inch.
Size of Bolt 20 = ¼ inch diameter,
20 SAE thread, 1 inch in length.
---

OPERATION

Referring to the embodiment of FIG. 2, the trap holder 32 is nailed directly to log 46 by means of nail 50 passing through hole 44 in base 30 and into log 46. However, holes 44 may also be used to wire the holder 32 to any supporting member or to nail the holder 32 to the ground 48. While the holder 32 is shown extending upwardly from log 46 in FIG. 2, it should be understood that the holder 32 may be so positioned as to extend in any desired direction. With the holder secured in place, the jaws 52 of trap 54 are moved to the position shown in FIG. 2 against the force of coil spring 60 which urges or biases the jaws 52 in the direction of arrows 58. A substantial length of jaws 52 is brought into frictional contact with the outer surface of legs 34,36 of holder 32 and positioned between flanges 38,40 and the raised dimples 42. The retainer 64 is releasably secured between the jaws 52. The trap 54 is now set and securely held in place by holder 32. Upon movement of trigger 66, the retainer 64 is released from its position between the jaws and the jaws 52 of the trap 54 move in the direction of arrows 58 to a closed position and the trap 54 is free of the holder 32.

Referring to the embodiment of FIG. 3, the adaptor 16 is placed about stake 10 and held in place at the desired location by bolt means 20 bearing against the stake 10. The holder 32 is secured to the adaptor 16 by means of tongues 22,24 passing through slots 26,28, respectively, as best seen in FIG. 1 and being bent over when in place. While FIG. 3 shows the stake 10 extending upwardly from the ground 48 and the holder 32 extending horizontally, it should be understood that the stake 10 and holder 32 could extend in any other direction, as desired. With the holder 32 in place, the trap 54 is placed in the set position as described above. In addition, the trap 54 is released or sprung to a closed position as described above.

While it has been discovered that the holder 32 and adaptor 16 may be made by bending sheet steel, it should be understood that other materials and methods of fabrication may be used to make the holder 32 and the adaptor 16. For example, the holder 32 and adaptor 16 may be made from plastic material by extrusion or injection molding. In addition, metals and materials other than plastic and steel may be used.

Although I have described my invention hereinabove in considerable detail, I do not wish to be limited narrowly to the exact and specific particulars, but I may also use such substitutes, modifications and equivalents as are included within the scope and spirit of my invention.

I claim:

1. In combination, an animal trap holder and a trap, said trap having a pair of spring biased jaws held in spaced relationship when said trap is set and movable away from each other when said trap is sprung, said holder comprising a substantially U-shaped member having first and second leg portions made of sheet material and connected together by an integral base portion, said first and second leg portions each having an outer flat rectangular surface, the sides of said flat rectangular surface being of a distance substantially greater than the thickness of said first and second leg portions, the free ends of said first and second leg portions each having a flange portion extending outwardly therefrom and holding said jaws in contact with a substantial distance on the outer surface of said first and second leg portions when said trap is set and to release said jaws when said trap is sprung, the free ends of said first and second leg portions being manually adjustable toward and away from each other to accomodate different sizes of said trap.

2. The animal trap holder of claim 1 wherein said holder is made from sheet steel.

3. The animal trap holder of claim 1 further including a pair of outwardly extending dimples on the outer surfaces of each of said first and second leg portions which cooperate with said flange portion to receive and hold said jaws when said trap is set.

4. The animal trap holder of claim 3 further including openings in said base portion to facilitate fixing said holder in place.

5. An animal trap holder for a trap having a pair of spring biased jaws held in spaced relationship when said trap is set and movable away from each other when said trap is sprung, said holder comprising a substantially U-shaped member having first and second leg portions connected together by an integral base portion, said first and second leg portions each having an outer flat rectangular surface, the free ends of said first and second leg portions each having a flange portion extending outwardly therefrom and adapted to receive and hold said jaws in contact with a substantial distance on the outer surface of said first and second leg portions when said trap is set and to release said jaws when said trap is sprung, and a substantially U-shaped adaptor having adaptor leg portions connected together by an integral adaptor base portion, the free ends of said adaptor leg portions having tongue portions extending through slots in said base portion of said holder and thereby securing said adaptor to said holder.

6. The animal trap holder of claim 5 wherein said adaptor is made from sheet steel.

7. The animal trap holder of claim 5 further including bolt means in threaded engagement with one of said adaptor leg portions and arranged to bear against a stake which passes between said adaptor leg portion to adjustably secure said adaptor to said stake.

8. The animal trap holder of claim 7 further including a pair of outwardly extending dimples on the outer surface of each of said first and second leg portions which cooperate with said flange portion of said first and second leg portions to receive and hold said jaws when said trap is set.

* * * * *